(12) United States Patent
Cretella et al.

(10) Patent No.: US 12,719,248 B2
(45) Date of Patent: Aug. 25, 2026

(54) FIRE RATED FLOOR BOX INSTALLATION ASSEMBLY

(71) Applicant: Hubbell Incorporated, Shelton, CT (US)

(72) Inventors: Joseph Nicholas Cretella, Ansonia, CT (US); Donald Wayne Nicholas, III, Staunton, IL (US); Athanasios Diakomis, Seymour, CT (US); Richard Benjamin Fabozzi, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 171 days.

(21) Appl. No.: 18/737,333

(22) Filed: Jun. 7, 2024

(65) Prior Publication Data

US 2024/0413623 A1 Dec. 12, 2024

Related U.S. Application Data

(60) Provisional application No. 63/506,873, filed on Jun. 8, 2023.

(51) Int. Cl.
*H02G 3/12* (2006.01)
*E04B 1/94* (2006.01)

(52) U.S. Cl.
CPC . *H02G 3/12* (2013.01); *E04B 1/94* (2013.01)

(58) Field of Classification Search
CPC .. H02G 3/12; H02G 3/185; E04B 1/94; E04B 1/947; E04B 5/40; E04G 15/061
USPC .......................................................... 174/50
See application file for complete search history.

(56) References Cited

U.S. PATENT DOCUMENTS

| | | | |
|---|---|---|---|
| 3,303,264 | A | 2/1967 | Saul et al. |
| 3,609,210 | A | 9/1971 | Guritz |
| 4,030,259 | A | 6/1977 | Meckler |
| 5,467,565 | A | 11/1995 | Bowman et al. |

(Continued)

FOREIGN PATENT DOCUMENTS

| | | | |
|---|---|---|---|
| GB | 2249881 | S | 5/1992 |
| WO | 03/104587 | A1 | 12/2003 |

OTHER PUBLICATIONS

PCT/US2024/033012 International Search Report and Written Opinion dated Sep. 3, 2024.

(Continued)

*Primary Examiner* — Timothy J Thompson
*Assistant Examiner* — Michael F Mcallister
(74) *Attorney, Agent, or Firm* — Robinson + Cole LLP

(57) ABSTRACT

A floor box installation assembly includes a floor box, a pour pan, a first support, and a second support. The floor box has a bottom and a wall extending from the bottom to at least partially define a first interior having a wiring compartment. The wall can include a knockout. The pour pan is configured to be inserted into an opening in a floor deck. The pour pan has a bottom wall, a side wall extending from the bottom wall, and a side flange extending from the side wall. The bottom wall and side wall at least partially defining a second interior. The first support and second support are connected to the pour pan. The first and second supports are configured to support the floor box above the first interior so that a conduit can be connected in communication with the knockout above the pour pan.

20 Claims, 17 Drawing Sheets

(56) References Cited

U.S. PATENT DOCUMENTS

| | | | | |
|---|---|---|---|---|
| 7,045,706 | B1 * | 5/2006 | Lincoln, III | H02G 3/185<br>174/53 |
| 10,084,297 | B2 | 9/2018 | Scanzillo et al. | |
| 2007/0074887 | A1 * | 4/2007 | Drane | H02G 3/185<br>174/50 |
| 2010/0051615 | A1 * | 3/2010 | Bowman | H02G 3/185<br>220/3.3 |
| 2023/0096708 | A1 | 3/2023 | Wurms et al. | |

OTHER PUBLICATIONS

Product Specifications, "Wiremold: Evolution Series Floor Boxes," legand, Jan. 2021. (28 pages).
Product Specifications, "Wiremold: RFB Series Fire Classified Floor Boxes," legand, Feb. 2015. (8 pages).
Presentation, "Wiremold® Fire Classified Floor Boxes & Poke-Thru Devices" legrand, Oct. 21, 2011. (19 pages).

* cited by examiner

FIRE RATED FLOOR BOX INSTALLATION ASSEMBLY

RELATED APPLICATION(S)

This application is based on U.S. Provisional Application Ser. No. 63/506,873, filed Jun. 8, 2023, the disclosure of which is incorporated herein by reference in its entirety and to which priority is claimed.

FIELD

Various exemplary embodiments relate to floor boxes, including recessed and raised access floor boxes, and components for installing floor boxes in sub-floors and floors.

BACKGROUND

Electrical floor boxes are known in the art for housing electrical components such as outlets or receptacle underneath a floor surface. The floor box can include separate compartments for power, data, and communication receptacles. Often the floor box has a hinged cover that pivots from a closed position to an open position.

In most commercial applications floor boxes are typically installed by cutting a hole in a steel floor deck and placing a pour pan into the opening. The pour pan has a bottom wall with openings for conduits to receive power, data, or communication cables. Conduits are run along the bottom of the floor using electrical metallic tubing (EMT) to shield the conductors. The EMT conduits are then run into the bottom of the pour pan so that connections can be made within the floor box. The floor box is then placed into the pour pan and any desired connections are made through the bottom of the floor box. Concrete can then be poured around the floor box and, if necessary, flooring can be installed over the concrete. Also if necessary, the floor box can be cut flush to the floor level.

Due to the openings created in the steel floor deck, the fireproof rating of the resulting floor can be compromised. This is typically compensated for by using intumescent material in or around the passages that extend from the EMT conduits through the floor deck, pour pan, and into the floor box.

SUMMARY

Certain configurations are directed to a floor box installation assembly including a first support configured to be connected to a pour pan and a second support configured to be connected to the pour pan. The first and second supports are configured to position a floor box at least partially above the pour pan during a floor installation process.

Certain configurations are directed to a floor box installation assembly including a first support configured to be connected to a pour pan and a second support configured to be connected to the pour pan. The first and second supports are configured to position a floor box at least partially above the pour pan during a floor installation process. A thermal member can be positioned between the floor box and the supports, between the supports and the pour pan, or a combination of both.

Certain configurations are directed to a floor box installation assembly including a first rail configured to be connected to a pour pan and a second rail configured to be connected to a pour pan. The first and second rails are configured to position a floor box at least partially above the pour pan during a floor installation process.

Certain configurations are directed to a floor box installation assembly including at least one support post configured to be connected to a pour pan. The support post is configured to position a floor box at least partially above the pour pan during a floor installation process.

In certain configurations, a floor box installation assembly includes a pour pan, a first support, and a second support. The pour pan is configured to be inserted into an opening in a floor deck. The pour pan has a bottom wall, a side wall extending from the bottom wall, and a side flange extending from the side wall. The bottom wall and side wall at least partially define a second interior. The first support and second support are connected to the pour pan. The first and second supports are configured to support a floor box above the second interior so that a conduit can be connected in communication with the knockout above the pour pan.

In certain configurations, a floor box installation assembly includes a floor box, a pour pan, a first rail, and a second rail. The floor box has a bottom and a wall extending from the bottom to at least partially define a first interior having a wiring compartment. The wall can include a knockout. The pour pan is configured to be inserted into an opening in a floor deck. The pour pan has a bottom wall, a side wall extending from the bottom wall, and a side flange extending from the side wall. The bottom wall and side wall at least partially define a second interior. The first rail and second rails are connected to the pour pan. The first and second rails are configured to be spaced above the pour pan to support the floor box above the second interior so that a conduit can be connected in communication with the knockout above the pour pan.

In certain configurations, a floor box installation assembly includes a floor box having a bottom and a plurality of walls extending from the bottom to at least partially define a first interior having a wiring compartment. At least one of the walls having a knockout. A pour pan is configured to be inserted into an opening in a floor deck. The pour pan has a bottom wall, a plurality of side walls extending from the bottom wall, and a side flange extending from each side wall. The bottom wall and side walls at least partially define a second interior. A first rail is connected to the pour pan. A second rail is connected to the pour pan. The first and second rails are configured to be spaced above the pour pan to support the floor box above the second interior so that a conduit can be connected in communication with the knockout above the pour pan.

In certain configurations, a floor box installation and flooring assembly includes a floor deck having an opening. A floor box includes a bottom and a wall extending from the bottom to at least partially define a first interior having a wiring compartment. The wall can include a knockout. A pour pan is configured to be inserted into the opening in the floor deck. The pour pan has a bottom wall, a side wall extending from the bottom wall, and a side flange extending from the side wall. The bottom wall and side wall at least partially define a second interior. A first rail is connected to the pour pan. A second rail is connected to the pour pan. The first and second rails are configured to be spaced above the pour pan to support the floor box above the first interior so that the first interior can be filled with a floor material to form an unbroken lower surface.

In certain implementations, a floor box installation includes cutting a hole in a floor deck to form an open space. A pour pan is positioned in the open space. The pour pan has a bottom wall, a side wall extending from the bottom wall, and a side flange extending from the side wall. The bottom wall and side wall at least partially define an interior. A first rail is connected to the pour pan so that the first rail extends above at least a portion of the interior. A second rail is connected to the pour pan so that the second rail extends above at least a portion of the interior. The floor box is positioned on the first rail and the second rail. The floor box having a bottom, a wall extending from the bottom, and top plate connected to the wall. The floor box being positioned on the rails so that the bottom is positioned above the interior of the pour pan. A conduit is connected to the wall of the floor box. A flooring material is poured into the interior and around the floor box. The flooring material forms an unbroken surface in the interior of the pour pan.

In certain configurations, a floor box installation assembly includes a floor box, a pour pan, a first support, and a second support. The floor box has a bottom and a wall extending from the bottom to at least partially define a first interior having a wiring compartment. The wall can include a knockout. The pour pan is configured to be inserted into an opening in a floor deck. The pour pan has a bottom wall, a side wall extending from the bottom wall, and a side flange extending from the side wall. The bottom wall and side wall at least partially define a second interior. The first support and second support are connected to the pour pan. The first and second supports are configured to support the floor box above the second interior so that a conduit can be connected in communication with the knockout above the pour pan.

In certain configurations, a floor box installation assembly includes a floor box having a bottom and a plurality of walls extending from the bottom to at least partially define a first interior having a wiring compartment. At least one of the plurality of walls has a knockout. A pour pan is configured to be inserted into an opening in a floor deck. The pour pan has a bottom wall, a plurality of side walls extending from the bottom wall, and a side flange extending from each side wall. The bottom wall and side walls at least partially define a second interior. A first post connected to the pour pan. A second post connected to the pour pan. The first and second posts are configured to support the floor box above the second interior so that a conduit can be connected in communication with the knockout above the pour pan.

In certain implementations, a floor box installation includes cutting a hole in a floor deck to form an open space. A pour pan is positioned in the open space. The pour pan has a bottom wall, a side wall extending from the bottom wall, and a side flange extending from the side wall. The bottom wall and side wall at least partially define an interior. A first support is connected to the pour pan. A second support is connected to the pour pan. The floor box is positioned on the first and second supports. The floor box having a bottom, a wall extending from the bottom, and top plate connected to the wall. The floor box being positioned on the supports so that the bottom is positioned above the interior of the pour pan. A conduit is connected to the wall of the floor box. A flooring material is poured into the interior and around the floor box. The flooring material forms an unbroken surface in the interior of the pour pan.

BRIEF DESCRIPTION OF THE DRAWINGS

The aspects and features of various exemplary embodiments will be more apparent from the description of those exemplary embodiments taken with reference to the accompanying drawing.

DETAILED DESCRIPTION OF EXEMPLARY EMBODIMENTS

A floor box assembly can include a floor box and a cover configured to connect to the floor box. The floor box is intended to be mounted in the floor of a building and to house one or more electrical components that are accessible to a user through the cover. The electrical components can include various wiring devices such as electrical receptacles, video connections, phone connections, data connections, or other power or communication devices. The floor box can have a variety of configurations that includes different sizes and shapes and different internal and external components. The different components can be modular to create different configurations within a single floor box. Different covers can also be used with different floor boxes. As would be understood by one of ordinary skill in the art, the floor box can be classified by the number of electrical components or gangs that can be placed into the floor box.

Floor boxes can be installed in any surface, including carpet, tile, raised access flooring, and concrete. When being installed in a concrete floor, a floor box can include a non-metallic temporary cover, for example made from a polymer material, although other materials can be used. The temporary cover can be releasably connected to the floor box or to a permanent cover, for example through a snap fit connection. After the floor box has been set in the floor, for example after a concrete pour, the temporary cover can be broken off or otherwise removed. The concrete can be poured up to and over a portion of the temporary cover which prevents concrete, or other flooring material, from getting into the floor box during installation. Examples of a floor box, cover assembly, and installation method are described in U.S. Pat. No. 10,084,297, the disclosure of which is hereby incorporated by reference in its entirety.

Figure 1:
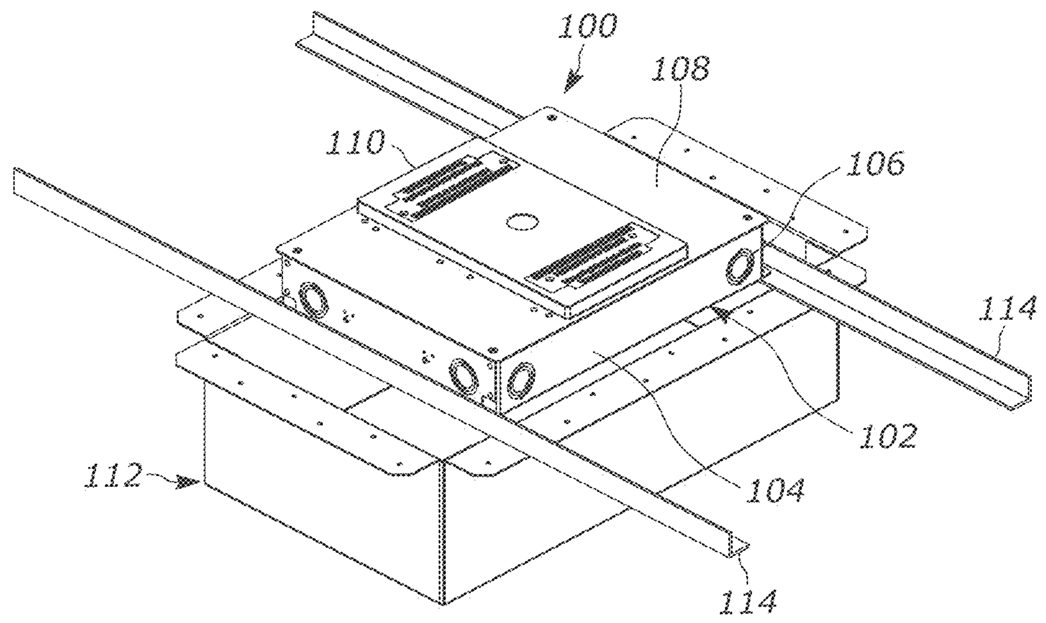
FIG. 1 is a perspective view of a floor box installation assembly.

FIG. 1 shows an exemplary embodiment of a floor box 100 and a support assembly configured to position the floor box 100 in a floor. The floor box 100 includes a housing 102 having one or more side walls 104 at least partially defining an interior. The illustrated embodiment shows a rectangular configuration of a floor box 100 having four side walls 104. Other configurations can be used including fewer side walls, such as a single cylindrical wall, or a greater number of side walls, for example a hexagon or octagon configuration. One or more knockouts 106 are provided in the housing 102. In the illustrated embodiment, each side wall 104 includes two knockouts 106, although more or fewer knockouts 106 can also be used. The knockouts 106 can be removed by a user to attach conduits to that run power or data communication lines into the interior.

An upper flange 108 can be connected to the side walls 104. The upper flange 108 helps to cover the interior. An outer cover 110 can be connected to the upper flange 108. The outer cover 110 can be placed over an inner cover and can be removable and disposable after installation of the floor box 100. In certain embodiments, the outer cover 110 can be made of a plastic material can be releasably connected to the inner cover through one or more releasable connections.

During certain installations, the floor box 100 can be positioned over and connected to a pour pan 112 that has been inserted in a floor. One or more supports can position the floor box 100 relative to the pour pan 112. The supports can have different configurations. In certain configurations, the supports will position the floor box 100 so that all of the floor box 100 is above an upper facing plane of the pour pan 112.

In certain implementations, the supports can be one or more rails 114. The floor box 100 can sit on the one or more rails 114 that connect to the pour pan 112, so that the floor box 100 is positioned above the pour pan 112. Flooring material, such as concrete, can be poured around the floor box 100 and into the pour pan 112 so that the flooring material forms a barrier underneath the floor box 100. In certain embodiments, conduits are connected to the sides of the floor box 100 only, so that no conduits need to extend underneath of the floor box 100, into the pour pan 112, or into or through the associated substrate flooring.

Figure 2:
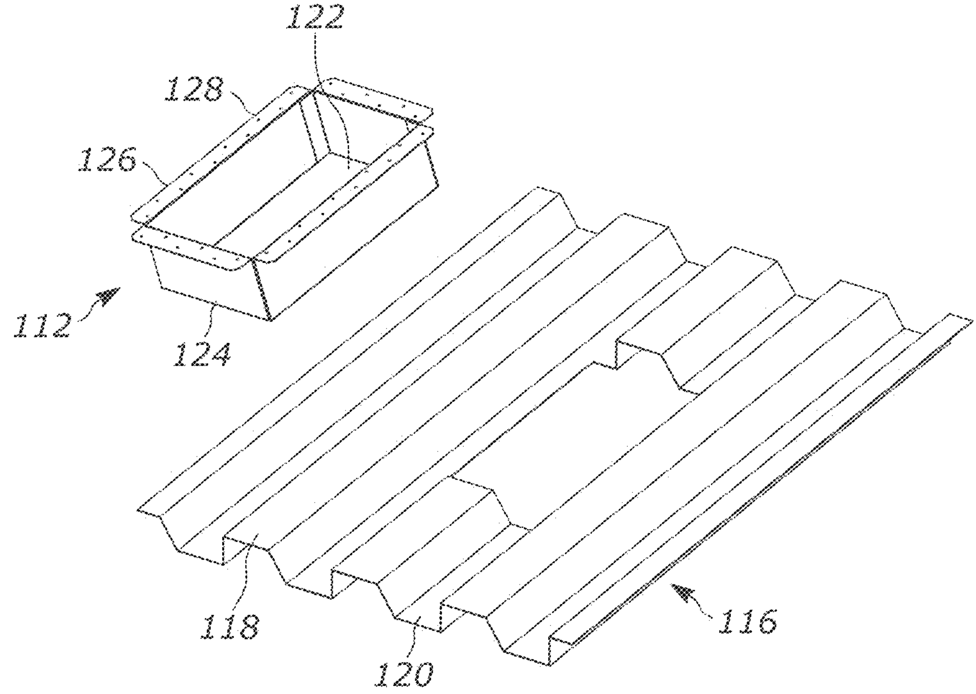
FIG. 2 is a perspective view of a pour pan and floor deck.

FIG. 2 shows an exemplary embodiment of the pour pan 112 positioned for installation in a subfloor. The subfloor can be a metal floor decking 116 having a series of plateaus 118 and valleys 120. This structure can help provide structural support and increase adhesion of poured floors, such as concrete. An opening can be formed in the decking 116 to receive the pour pan 112. The opening can be sized to substantially correspond to the size of the pour pan 112.

The pour pan 112 includes a bottom wall 122 and one or more side walls 124 extending from the bottom wall 122. The bottom wall 122 and side walls 124 combine to at least partially define an interior of the pour pan 112. In the illustrated embodiment, four side walls 124 are utilized in a substantially rectangular configuration which is configured to correspond to the associated floor box 100. Other configurations, different sizes and shapes can be used depending on the configuration of the floor box 100. One or more flanges 126 can extend outwardly from the side walls 124 away from the interior. A series of openings 128 can be formed in each of the flanges 126. In certain implementations, the openings can be used to secure the pour pan 112 to the decking 116. The illustrated embodiment shows four discrete, separated flanges 126, with each flange 126 associated with a respective side wall 124. Other configurations can include a single flange 126 extending around the entire exterior of the pour pan 112 or flanges extending from only some of the side walls 124.

Figure 3:
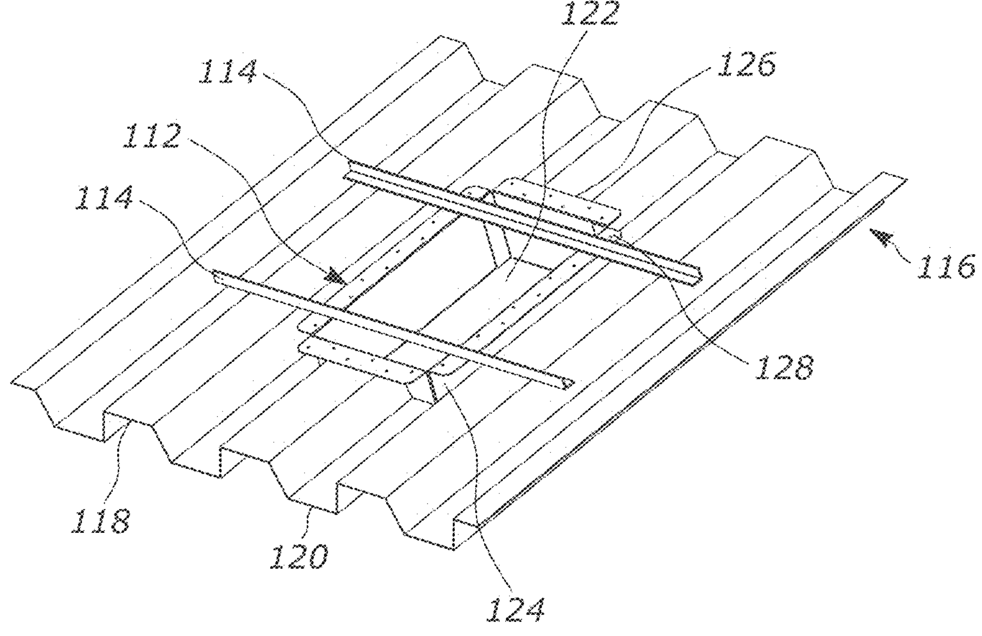
FIG. 3 is a perspective view of the pour pan positioned in the floor deck and a pair of rails connected to the floor box.

As best shown in FIG. 3, when the pour pan 112 is placed in the opening in the decking 116, one or more of the flanges 126 can rest on the plateaus 118 of the decking 116. A pair of rails 114 can be connected to the pour pan 112. In an exemplary embodiment, the openings 128 in the flanges 126 can be used to at least partially limit the movement of the rails 114 relative to the pour pan 112. The openings 128 therefore can be used to place the rails 114 at different locations and orientations relative to the pour pan 112. For example, fasteners can be placed in the openings 128 to restrict movement of the rails 114 relative to the pour pan 112. In other configurations, fasteners can extend through the rails 114 and into the openings 128 to secure the position of the rails relative to the pour pan. The illustrated embodiment shows two L-shaped rails 114 having a first leg and a second leg extending approximately 90 degree from the second leg. In other configurations, fewer or more rails 114 can also be used, and the rails 114 can have different configurations as needed.

Figure 4:
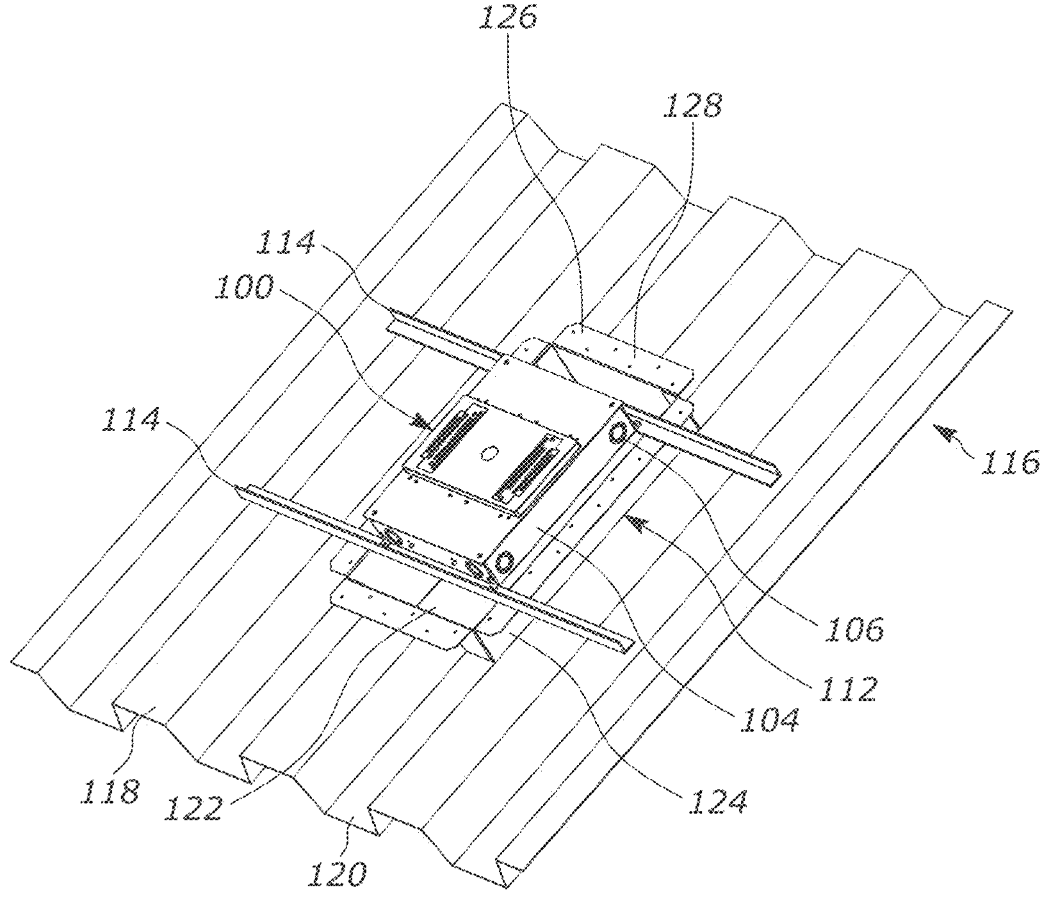
FIG. 4 is a perspective view of a floor box connected to the rails and pour pan.
Figure 5:
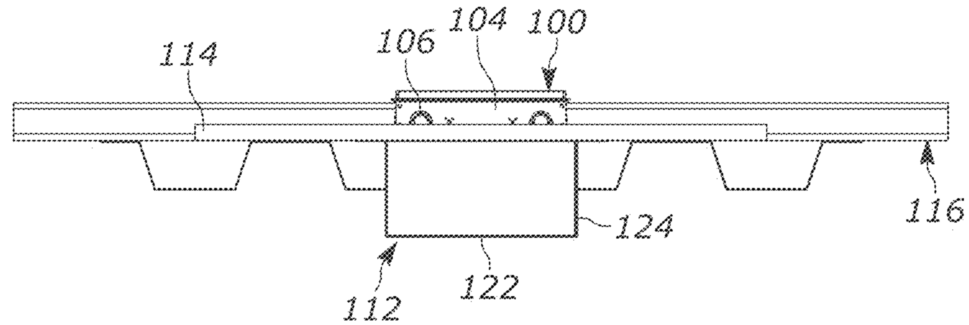
FIG. 5 is a side, sectional view of the assembly of FIG. 4.

As best shown in FIGS. 4 and 5, once the rails 114 are set in place the floor box 100 can be connected to the pour pan 112. In an exemplary embodiment, the floor box 100 is placed on the rails 114. This allows the floor box 100 to be positioned along the rails 114 in an adjustable manner relative to the pour pan 112. The floor box 100 is supported by the rails 114 positioned above the interior of the pour pan 112. In this orientation the interior of the pour pan 112 is open to receive a flooring material and the knockouts 106 of the floor box 100 are accessible above the pour pan 112. In certain configuration, the floor box 100 can be secured to the rails 114. For example, one or more fasteners can extend through a footing or other aperture in the floor box 100 and into the rails 114.

Figure 6:
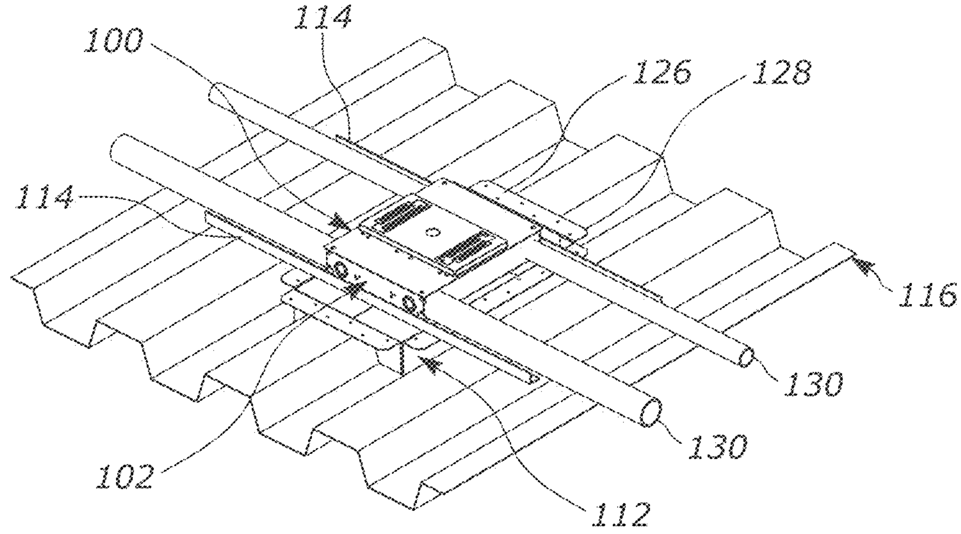
FIG. 6 is a perspective view of the assembly of FIG. 4 with conduits connected to the floor box.

As best shown in FIG. 6, after the floor box 100 is positioned on the rails 114, one or more conduits 130 can be connected to the floor box 100. The conduits 130 can extend from the sides 104 of the floor box 100. As required, the knockouts 106 can be removed and conduits 130 connected in the desired places to form connections for power and data conduits to be run into the interior of the floor box.

Positioning the floor box 100 on the rails 114 and outside of the pour pan 112 enables these side connections which differs from the typical installation which requires conduits to extend underneath the floor box 100 and through the metal decking 116. Running conduits from underneath the floor box 100 would create a broken or non-continuous floor surface in the pour pan interior, which can lead to reduced fire rating in buildings or require additional steps and materials to retain an appropriate fire rating. Running the conduits 130 from the side allows the conduits 130 to be completely embedded in the concrete flooring. This can eliminate the need to use intumescent material to increase the fire rating around the inlets of the conduits. It also can allow for the use of polymer conduits, such as PVC tubing. This can reduce the time and expense associated with installation costs by eliminating the need for a rack system and EMT tubing to be run underneath the decking. EMT tubing must be positioned and run in straight lines, which can take up significant space and be difficult to install. PVC conduits can have curves or bends, which creates greater flexibility and reduces installation time.

Figure 7:
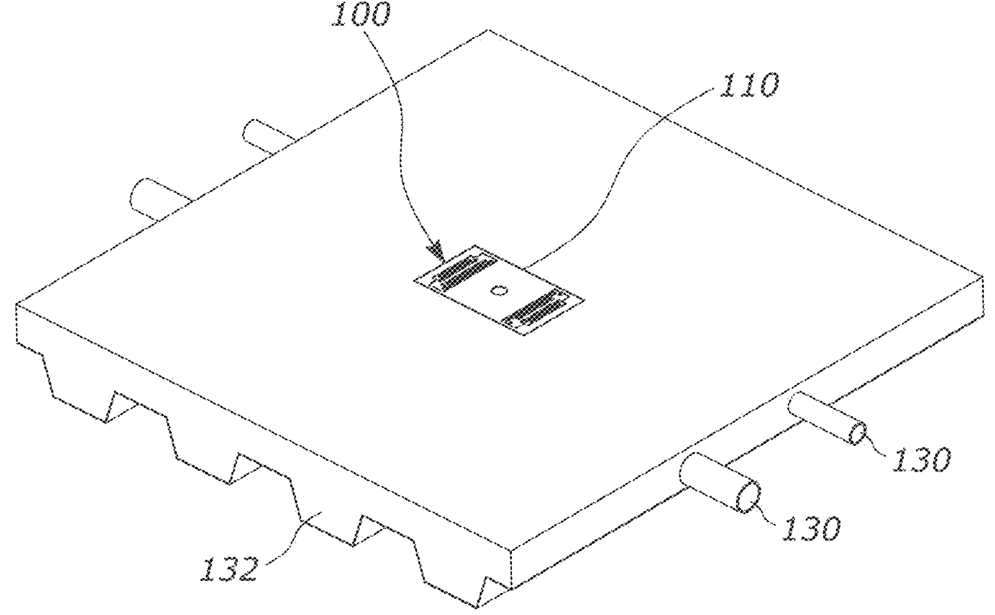
FIG. 7 is a perspective view of FIG. 6 with a flooring material surrounding the floor box and conduits.

As shown in FIG. 7, After the conduits are installed, the flooring material 132 can be poured around the pour pan 112, conduits 130, and the floor box 100. The flooring material 132 can be concrete or other material that can be poured and cured into a hardened state. The flooring material 132 will enter the pour pan 112 and form an unbroken, monolithic surface underneath the floor box 100. The flooring material can be poured until it is substantially level with at least a portion of the outer cover 110 of the floor box 100. The outer cover 110 can be removed after the floor material 132 has hardened to provide access to the floor box 100.

Figure 8:
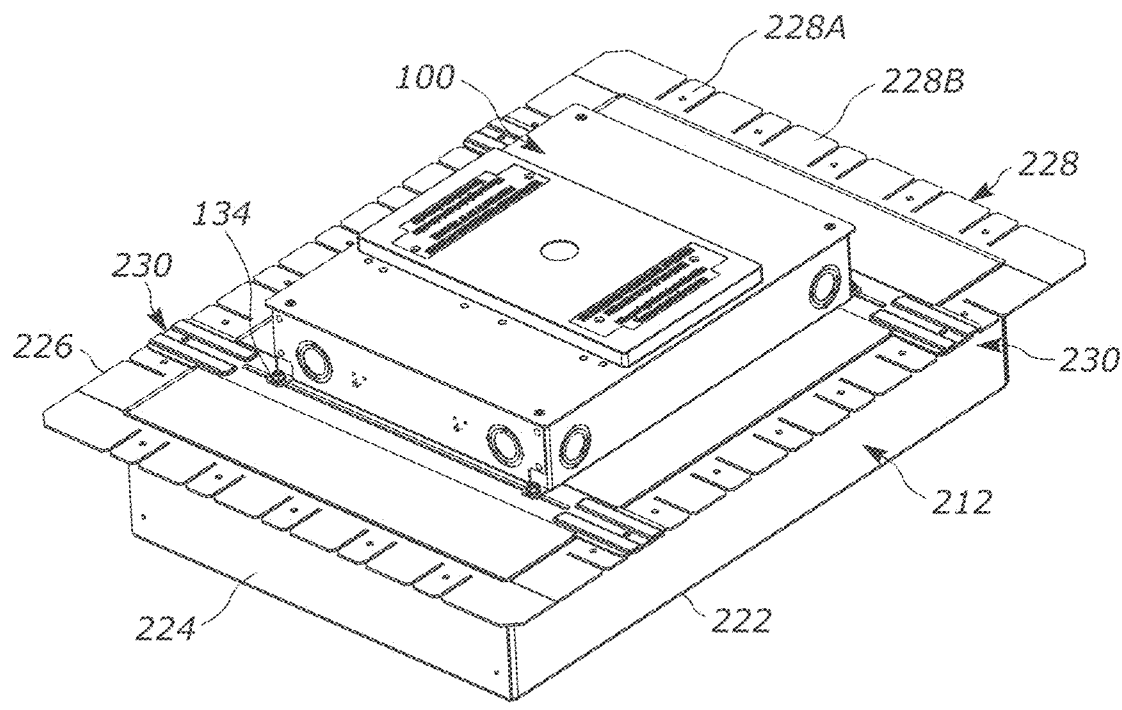
FIG. 8 is a perspective view of a floor box connected to a set of rails and a pour pan.

FIG. 8 shows another exemplary configuration of a support and pour pan 212 that can be used to position the floor box 100 in a floor. The pour pan 212 includes a bottom wall 222 and one or more side walls 224 extending from the bottom wall 222. The bottom wall 222 and side walls 224 combine to at least partially define an interior of the pour pan 212. In the illustrated embodiment, four side walls 224 are utilized in a substantially rectangular configuration. Other configurations, different sizes and shapes can be used depending on the configuration of the floor box 100. One or more flanges 226 can extend outwardly from the side walls 224 away from the interior.

Each of the flanges 226 can include one or more tabs 228 defined by slots. The tabs 228 can include one or more openings 230. The slots can be spaced so that the tabs 228 can be uniform size or have two or more different widths. The illustrated configuration shows a first set of tabs 228A having a first width and a second set of tabs 228B having a second width that is greater than the first width. The first tabs 228A and the second tabs 228B alternate on each side of the pour pan 212.

During installation into a metal decking 116, the first set of tabs 228A with the opening can be used to receive a fastener to secure the pour pan 212 to the decking. Because the position of the pour pan 212 relative to the decking 116 will vary for each installation, the tabs 228A can individually deflect or bend toward the decking 116 when secured with a fastener to minimize or eliminate deformation of the entire flange 226.

The floor box 100 is connected to the pour pan 212 by one or more supports. In the illustrated configuration, the supports including a set of rails 230. The floor box 100 can sit on the one or more rails 230 that connect to the pour pan 212, so that the floor box 100 is positioned above the pour pan 212. Flooring material, such as concrete, can be poured around the floor box 100 and into the pour pan 212 so that the flooring material forms a barrier underneath the floor box 100. In certain embodiments, conduits are connected to the sides of the floor box 100 only, so that no conduits need to extend underneath of the floor box 100, into the pour pan 212, or into or through the associated substrate flooring.

In certain configurations, the floor box 100 can include one or more flanges 134 that extend from a side wall of the floor box 100. The flanges 134 can include an opening for receiving a fastener to secure the floor box 100 to the rail 230. In certain implementations, the floor box 100 can be secured to the rail 230 using a wire to tie the flange 134 to the rail 230. The illustrated configuration shows a flange 134 at each corner of the floor box 100. Other configurations can include fewer or more flanges and in different positions.

Figure 9:
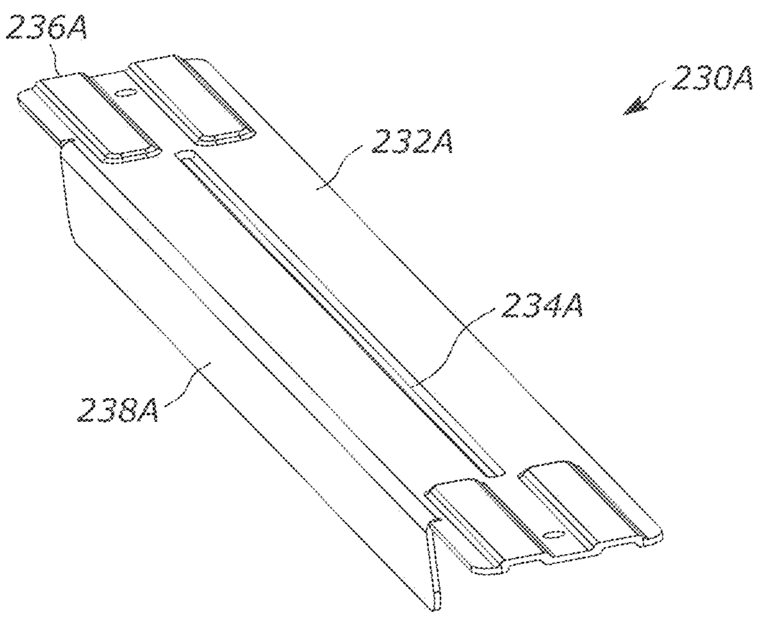
FIG. 9 is a perspective view of an exemplary rail.
Figure 10:
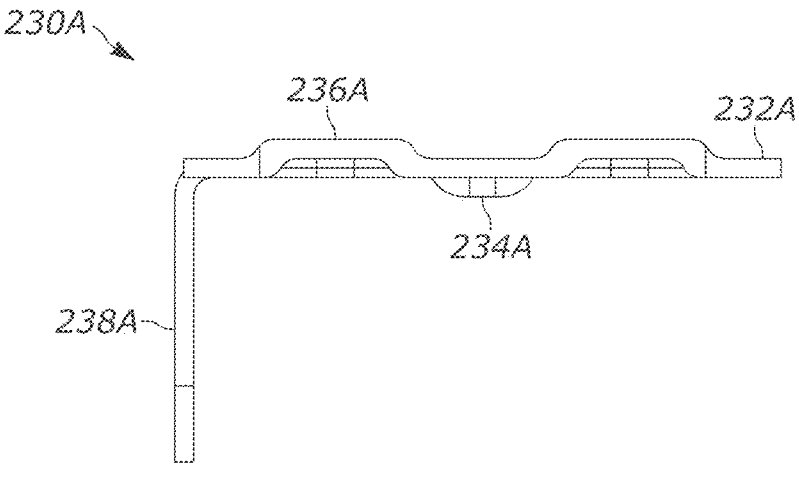
FIG. 10 is a side view of the rail of FIG. 9.

FIGS. 9 and 10 show a first configuration of a rail 230A. The rail 230A includes a base 232A having an upper major surface and a lower major surface. A central rib 234A extends along at least a portion of the base 232A. The central rib 234A can extend below the upper and lower surfaces of the base 232A. The central rib 234A can be configured to receive a fastener to secure the floor box 100 to the rail 230A. The size and length of the central rib 234A can be adjusted based on the size of the pour pan 212 and the fastener to be used to connect the pour pan 212 and the floor box 100. The central rib 234A can provide strength to the rail 230A as well as providing a groove to help locate a fastener to connect the floor box 100 if needed.

In certain configurations, one or more projections 236A extend from the base 232A above the upper surface. The projections 236A are shown as two sets of rectangular ribs, with one set positioned at each end of the base 232A. The projections 236A can act as strengthening ribs for the rail 230A. The projections 236A can be spaced from one another and an opening can be positioned between the projections 236A. The opening can receive a fastener to connect the rail 230A to the pour pan 212. The size, shape, and position of the projections 236A can be adjusted as needed.

A first side wall 238A extends from the base 232A. in certain configurations, the side wall 238A extends along only a portion of the base 232A, providing openings at the first end and the second end of the base 232A. The side wall 238A is configured to fit within the pour pan 212 with the outer ends extending over the flange 226. The side wall 238A can also help provide additional strength to the rail 230A.

In certain applications, the central rib 234A, the outer projections 236A, and the side wall 238A can provide sufficient strength to prevent deformation during installation of the floor box. In certain implements, the rails 230A can provide a temporary load resistance of up to 500 lbs (227 kgs). Greater load resistance or less load resistance can be achieved based on the needs of a specific implementation.

Figure 11:
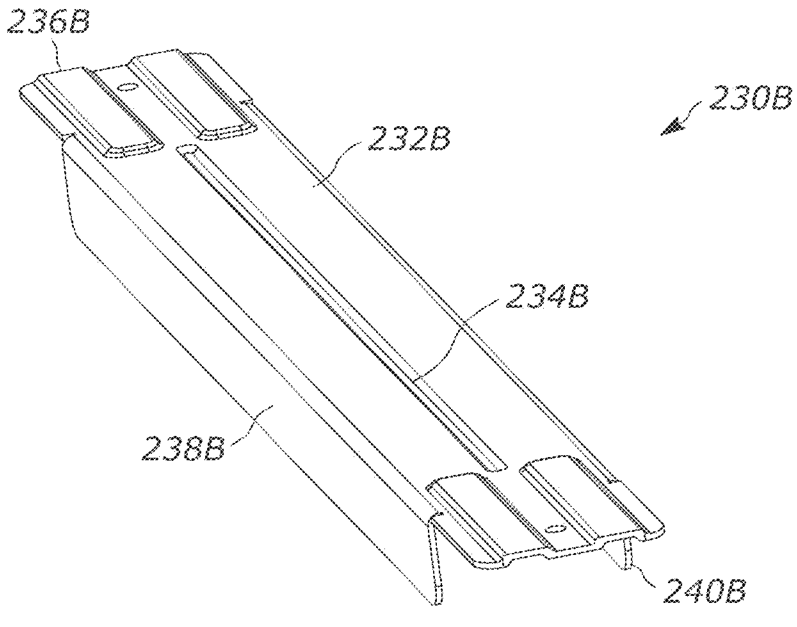
FIG. 11 is a perspective view of another exemplary rail
Figure 12:
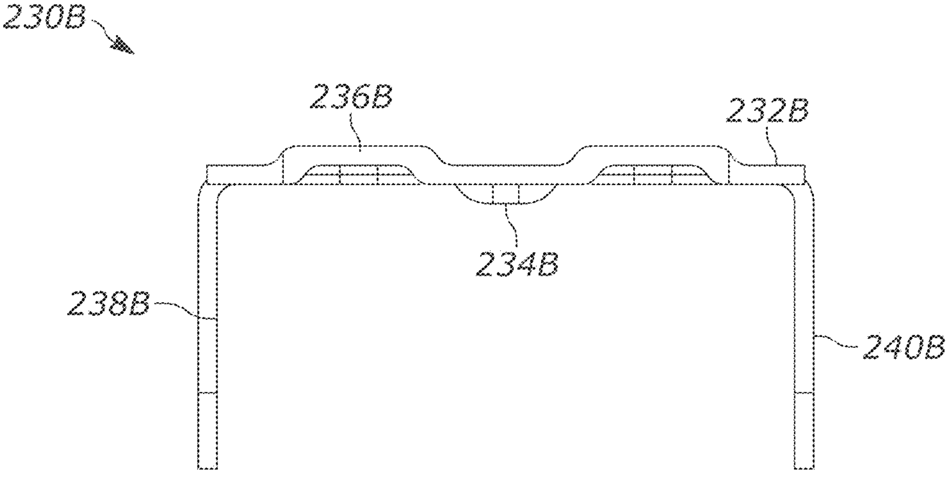
FIG. 12 is a side view of the rail of FIG. 11.

FIGS. 11 and 12 show a second configuration of a rail 230B. The rail includes a base 232B having an upper major surface and a lower major surface. A central rib 234B extends along at least a portion of the base 232B. The central rib 234B can extend below the upper and lower surfaces of the base 232B. The central rib 234B can be configured to receive a fastener to secure the floor box 100 to the rail 230B. The size and length of the central rib 234B can be adjusted based on the size of the pour pan 212 and the fastener to be used to connect the pour pan 212 and the floor box 100. The central rib 234B can provide strength to the rail 230B as well as providing a groove to help locate a fastener to connect the floor box 100 if needed.

In certain configurations, one or more projections 236B extend from the base 232B above the upper surface. The projections 236B are shown as two sets of rectangular ribs, with one set positioned at each end of the base 232B. The projections 236B can act as strengthening ribs for the rail 230B. The projections 236B can be spaced from one another and an opening can be positioned between the projections 236B. The opening can receive a fastener to connect the rail 230B to the pour pan 212. The size, shape, and position of the projections 236B can be adjusted as needed.

A first side wall 238B and a second side wall 240B extend from the base 232B. In certain configurations, the side walls 238B, 240B extend along only a portion of the base 232B, providing openings at the first end and the second end of the base 232B. The side walls 238B, 240B is configured to fit within the pour pan 212 with the outer ends extending over the flange 226. The side walls 238B, 240B can also help provide additional strength to the rail 230B.

In certain applications, the central rib 234B, the outer projections 236B, and the side walls 238B, 240B can provide sufficient strength to prevent deformation during installation of the floor box. In certain implements, the rails 230B can provide a temporary load resistance of up to 500 lbs (227 kgs). Greater load resistance or less load resistance can be achieved based on the needs of a specific implementation.

In certain implementations, the supports for the floor box 100 can include one or more posts positioned in the pour pan. The support posts can extend to or above the upper flange of the pour pan so that the floor box can be supported at or above the upper plane of the pour pan. Conduits can be connected to the floor box without running through the pour pan as shown FIG. 6. The configurations of the post can vary, including the size, shape, and position. The material used for the post can also vary. In certain configurations, the posts can be made from a molded polymer such as PVC.

Figure 13:
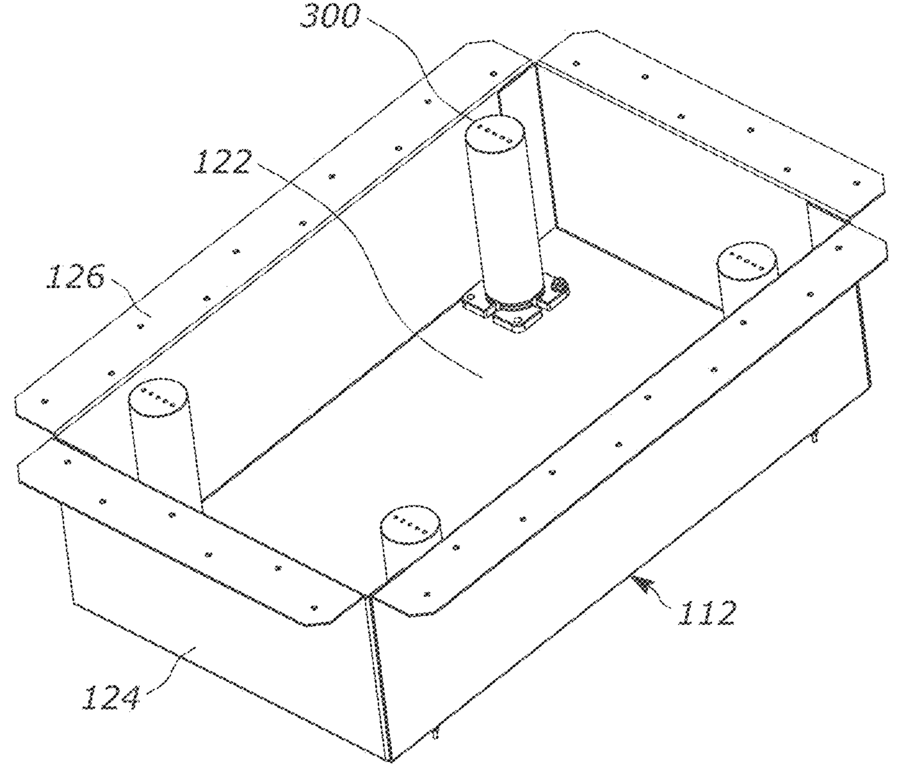
FIG. 13 is a perspective view of a pour pan and a set of support posts connected to the pour pan.
Figure 14:
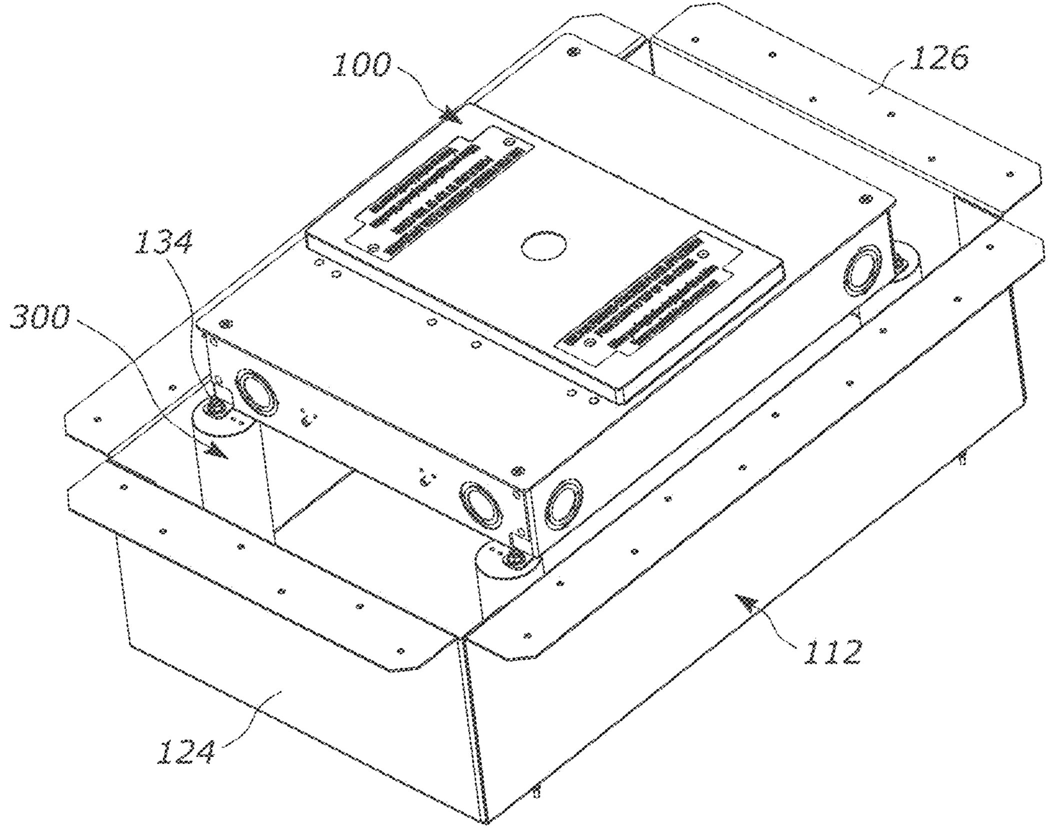
FIG. 14 is a perspective view of a floor box connected to the support posts and pour pan of FIG. 13.

FIGS. 13-14 show an exemplary configuration of a support post 300 positioned in a pour pan 112 to support a floor box 100. The support posts 300 can be secured to the pour pan 112 using one or more fasteners, for example self-drilling screws. Other connections, such as a joining material (adhesive, solder, weld) can also be used depending on the material choice of the components. The illustrated configuration shows four posts 300, with one post 300 positioned in each corner of the pour pan 112. More than four posts or fewer posts can be used. For example, two posts can be positioned in opposite corners, one central post can be used, or three posts in a triangular configuration can be used. More than four posts can also be used in various orientations.

The support posts 300 are positioned to receive a floor box 100. The floor box 100 is positioned on the support posts 300 so that the floor box 100 is positioned above the pour pan 112. The floor box 100 can include a flange 134 that receives a fastener to secure the floor box 100 to the posts 300. Other connections can also be used as appropriate.

Figure 15:
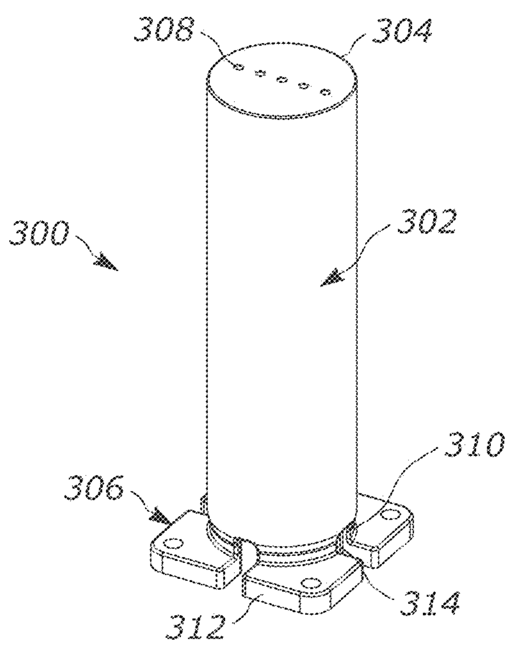
FIG. 15 is perspective view of a support post.
Figure 16:
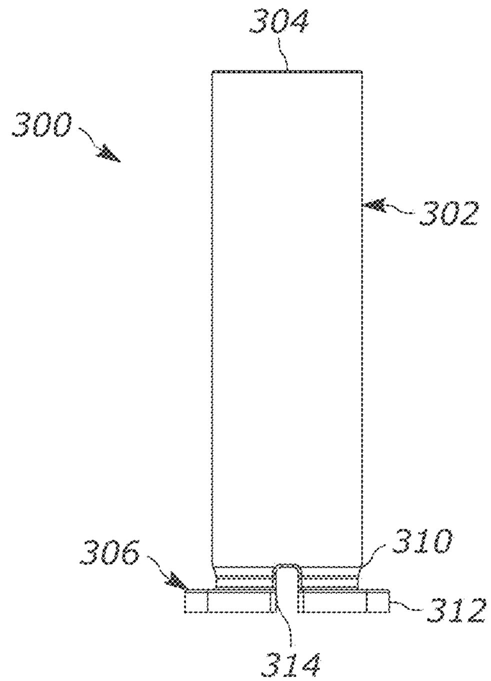
FIG. 16 is a side view of the support post of FIG. 15.

FIGS. 15-16 show an exemplary configuration of a support post 300. The support post 300 includes a substantially cylindrical body 302 with a closed top 304. The body 302 extends from a base 306 that is used to support the post 300 on the pour pan. The body 302 can be a hollow member. The hollow body can allow floor material, such as concrete to flow into the post 300. This can help to increase the fire rating of the assembly by providing more fire-resistant material. The top 304 of the post 300 can have one or more openings or depressions 308. The depressions 308 can be used to locate a fastener used to connect a floor box to the post 300. The bottom of the body 302 can include an undercut portion 310 that extends around the cylindrical body 302.

The base 306 can extend from the body 302. In the illustrated configuration, the base 306 is separated into four individual flanges 312 spaced apart by slots 314. The slots 314 can extend into the undercut 310 portion of the body 302. The slots can help flooring material flow into the support posts 300. In certain configurations, the base 306 has a substantially square configuration. Other shapes and sizes can also be used. The base 306 can include one or more openings to receive a fastener to secure the post 300 to the bottom wall of the pour pan.

Figure 17:
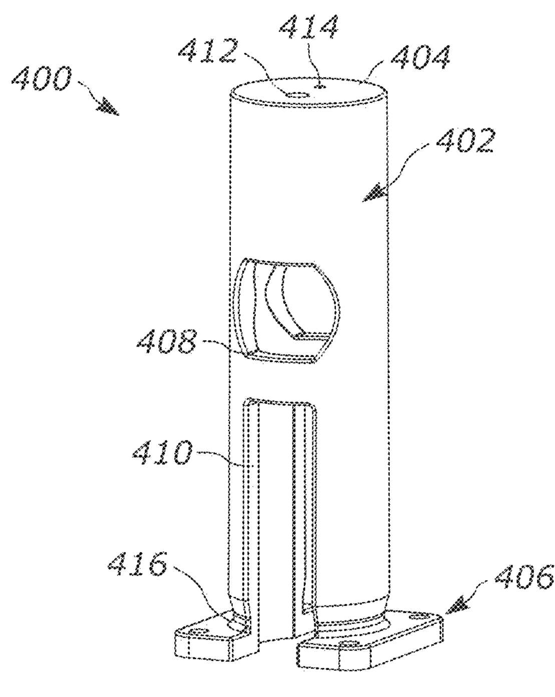
FIG. 17 is a perspective view of another configuration of support post.
Figure 18:
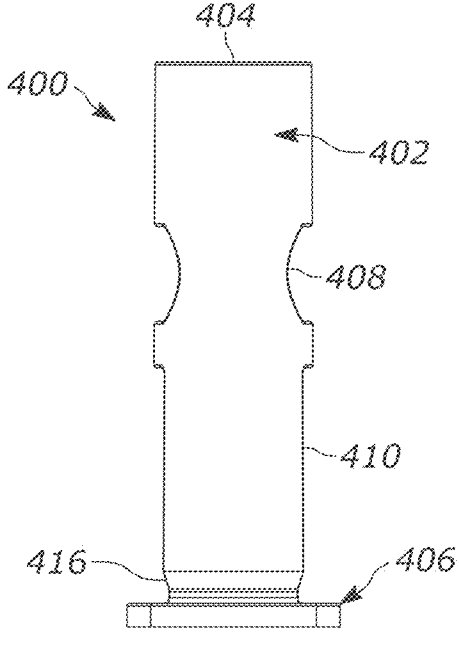
FIG. 18 is a side view of the support post of FIG. 17.
Figure 19:
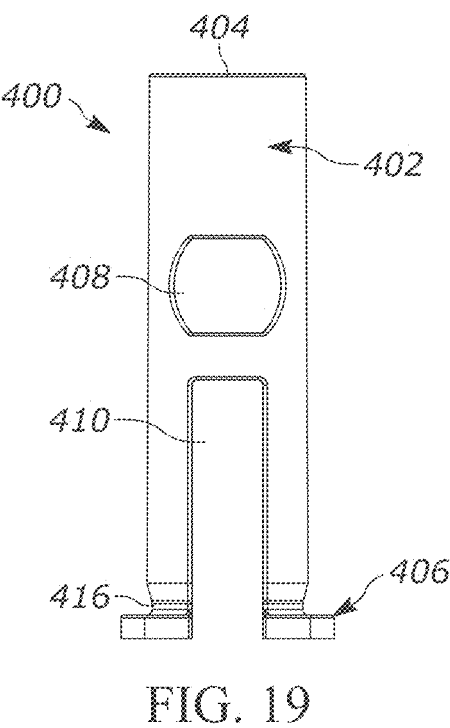
FIG. 19 is a front view of the support post of FIG. 17.

FIGS. 17-19 show an exemplary configuration of a support post 400. The support post 400 includes a substantially cylindrical body 402 with a closed top 404. The body extends from a base flange 406 that is used to support the post 400 on a pour pan. The body 402 can be a hollow member. The body 402 can include one or more openings that help allow flooring material flow into the hollow body.

In certain configurations, the body 402 can include one or more side openings 408. The illustrated configuration shows a first and second side openings 408 positioned one opposite sides of the body 402. The side openings 408 can have an obround configuration with curved sides and straight top and bottom. Other shapes can be used and the size of the openings can be adjusted as needed.

In certain configurations, the body 402 can also include one or more elongated slots 410. The illustrated configuration shows first and second elongated slots 410 positioned on opposite sides of the body 402. The elongated slots 410 can be positioned below the openings 408 and extend through the base flange 406. The slots 410 divide the base 406 into two individual sides.

The top 404 of the post 400 can have one or more openings 412 or depressions 414. For example, a depression 414 can be used to locate a fastener used to connect a floor box to the post 400. The opening 412 can allow for flooring material to flow into the body 402 to help increase the fire rating. The bottom of the body 402 can include an undercut portion 416 that extends around the cylindrical body 402.

In certain configurations, the base flange 406 has a substantially square configuration. Other shapes and sizes can also be used. The base flange 406 can include one or more openings to receive a fastener to secure the post 400 to the bottom wall of the pour pan.

In certain applications, the height of the floor box may need to be adjusted to accommodate for different floor depths. In some implements, one or more extension members can be connected to a post. The position of the extension members can be adjusted relative to the post so that the ultimate height of the floor box relative to the pour pan, and thus the end flooring, can be adjusted as needed. The material used for the extension can also vary. In certain configurations, the extensions can be made from a molded polymer such as PVC.

Figure 20:
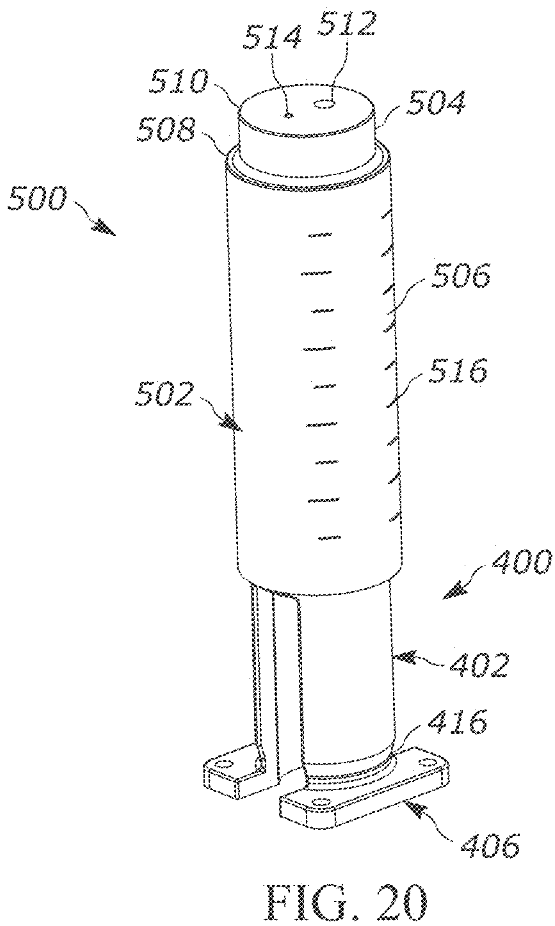
FIG. 20 is a perspective view of a support post and extension.

FIG. 20 shows an exemplary configuration of an extension member 500. The extension member 500 has a substantially cylindrical configuration with an outer wall 502 and a hollow interior configured to receive the support post 400. The extension 500 can be positioned over the support post 400 and slidably receive the support post 400. The size and shape of the extension member can therefore be varied to accommodate different configurations of support posts. The undercut 416 can help ensure that the extension 500 can be placed all the way over the body 402 of the post 400 if needed.

The extension 500 can be secured to the support post 400 at a desired height. Any appropriate connection can be used to secure the extension 500. In some implementations, a fastener, such as a set screw or thumb screw can be used. In other applications, different mating connections, including threads, keys, and other snap-fit connections can be provided. A joining material, such as an adhesive, solder, or weld could also be used. For example, when PVC is used, a PVC cement or other polymer adhesive can be used.

In certain configurations, the extension member can include an upper portion 504 and a lower portion 506. The upper portion 504 can have a reduced cross section relative to the lower portion 506. For example, the upper portion 504 can be a cylindrical member having a reduced diameter relative to the lower portion 506. The transition between the upper portion 504 and the lower portion 506 can form a shoulder 508.

The upper portion 504 can include an upper wall 510. Similar to the post 400, the upper wall 510 can include an opening 512 permitting flooring material to enter the extension 500 and a depression 514 for receiving a fastener.

In certain configurations, the lower portion 506 can have graduated markings 516 to help a user measure a specific height for placement of an installed floor box. The markings 516 can include lines as shown, but can also include numbers or letters depending on the type of installation.

Figure 21:
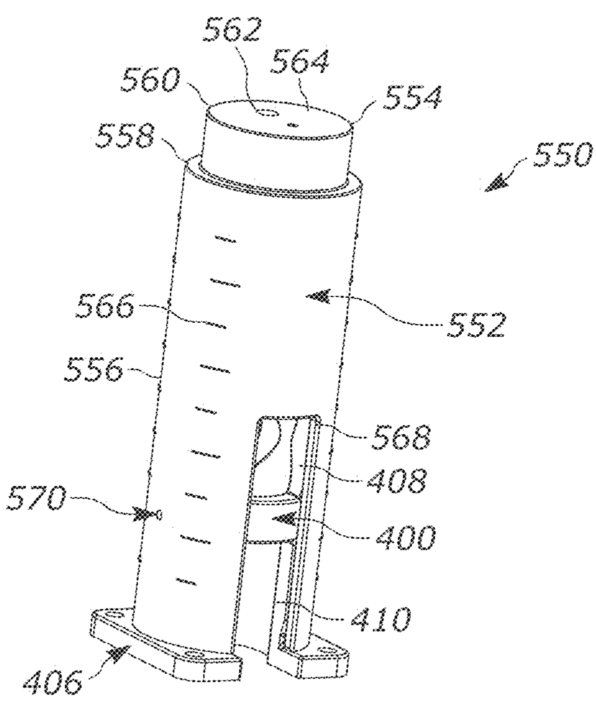
FIG. 21 is a perspective view of a support post and another configuration of an extension.
Figure 22:
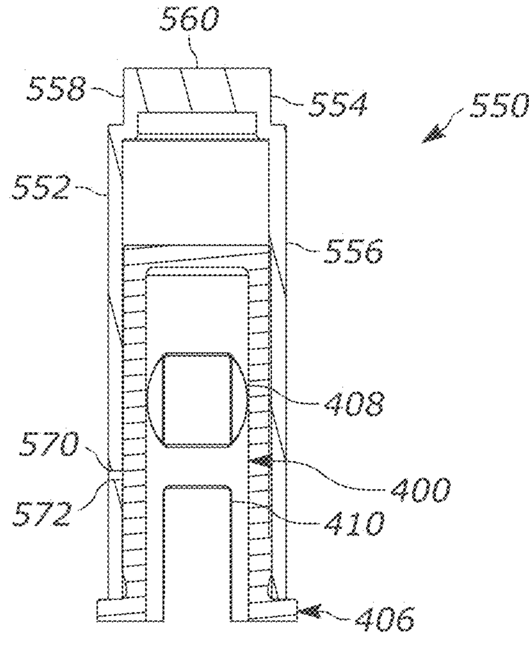
FIG. 22 is a sectional view of the support post and extension of FIG. 21.

FIGS. 21 and 22 show an exemplary configuration of an extension member 550. The extension member 550 has a substantially cylindrical configuration with an outer wall 552 and a hollow interior configured to receive the support post 400. The extension 550 can be positioned over the support post 400 and slidably receive the support post 400. The size and shape of the extension member can therefore be varied to accommodate different configurations of support posts. The undercut 416 can help ensure that the extension 500 can be placed all the way over the body 402 of the post 400 if needed.

In certain configurations, the extension member can include an upper portion 554 and a lower portion 556. The upper portion 554 can have a reduced cross section relative to the lower portion 556. For example, the upper portion 554 can be a cylindrical member having a reduced diameter relative to the lower portion 556. The transition between the upper portion 554 and the lower portion 556 can form a shoulder 558.

The upper portion 554 can include an upper wall 560. Similar to the post 400, the upper wall 560 can include an opening 562 permitting flooring material to enter the extension 550 and a depression 564 for receiving a fastener.

In certain configurations, the lower portion 556 can have graduated markings 566 to help a user measure a specific height for placement of an installed floor box. The markings 566 can include lines as shown, but can also include numbers or letters depending on the type of installation.

In certain configurations, the lower portion 556 includes one or more slots 568 extending from a bottom edge of the lower portion 556. The illustrated configuration includes a pair of opposing slots 568, although fewer or more slots can be used.

The extension slot 568 can have substantially the same width as the post slot 410. The height of the extension slot 568 can also be configured to expose the post slot 410 and at least a portion of the post side opening 408. This can help enable material to flow into the extension 550 and the post 400 when flooring material is being poured.

The lower portion can also include an opening 570 configured to receive a fastener to secure the extension 550 to the support post 400. The opening can receive a threaded screw which can extend into the post 400 or a friction engagement can be used such as a set screw 572 as shown in FIG. 22. In other configurations, a corresponding opening can be positioned on the post 400 so that a fastener extends through the extension member 550 and the support post 400.

Figure 23:
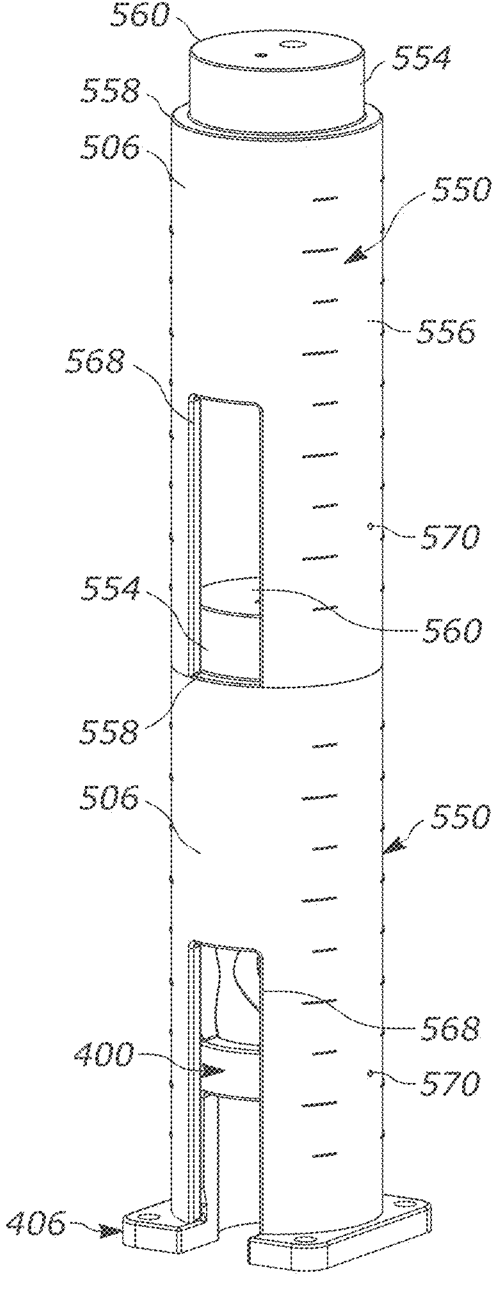
FIG. 23 is a perspective view of a support post and a pair of extensions.

As best shown in FIG. 23, more than one extension 550 can be used if needed. When using multiple extensions 550, a lower edge of the second extension 550 can be placed on the shoulder 508 of the first extension 550. The upper portion 504 of a first extension 550 can be nested in the lower portion 506 of the second extension 550.

Figures 24, 25:
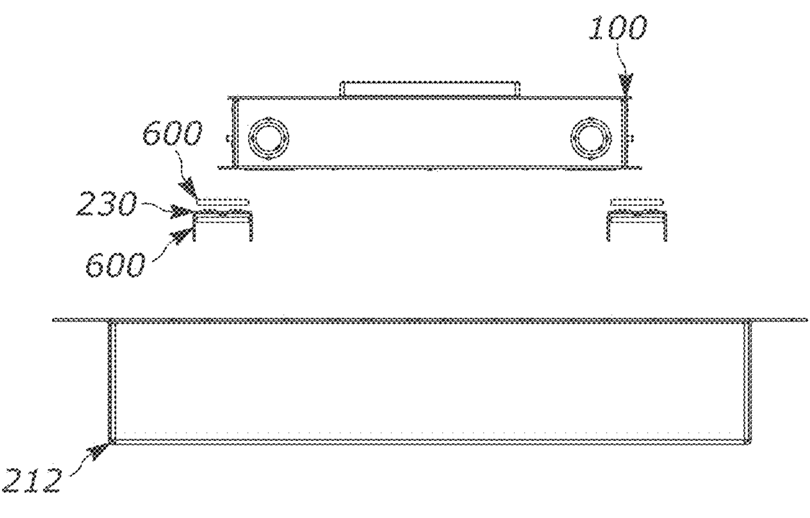
FIG. 24 is a side, exploded view of a pour pan, floor box, and rail assembly utilizing a thermal member.
FIG. 25 is a side, exploded view of pour pan, floor box, and support post assembly utilizing a thermal member.

FIG. 24 shows an exemplary implementation of the floor box installation assembly utilizing a floor box 100, a pour pan 212, and set of rails 230. One or more thermal members 600 can be utilized with the floor box installation. In certain implementations, the thermal members 600 can include thermal break or thermal installation material. The thermal members can be configured as, for example, a washer, disc, pad, strip, or mat of material. The size, shape, and material can be adjusted for different applications. The material can include a ceramic material or other minimally thermal conductive material. In other implementations the material can be an intumescent material. In certain configurations, the thermal members 600 are positioned between the rails 230 and the pour pan 212. In other configurations, the thermal members 600 are positioned between the rail 230 and the floor box 100. In some configurations, as illustrated, the thermal members 600 are positioned between the pour pan 212 and the rails 230 and between the rails 230 and the floor box 100.

FIG. 25 shows an exemplary implementation of the floor box installation assembly utilizing a floor box 100, a pour pan 112, and set of posts 400. One or more thermal members 600 can be utilized with the floor box installation. In certain implementations, the thermal members 600 can include thermal break or thermal installation material. The thermal members can be configured as, for example, a washer, disc, pad, strip, or mat of material. The size, shape, and material can be adjusted for different applications. The material can include a ceramic material or other minimally thermal conductive material. In other implementations the material can be an intumescent material. In certain configurations, the thermal members 600 are positioned between the posts 400 and the pour pan 112. In other configurations, the thermal members 600 are positioned between the posts 400 and the floor box 100. In some configurations, as illustrated, the thermal members 600 are positioned between the pour pan 112 and the post 400 and between the posts 400 and the floor box 100.

During installation, support posts 300, 400 can be positioned in a pour pan 112, 212. The support posts 300, 400 can be secured to the bottom wall of the pour pan 112, 212, for example using one or more fasteners for each post. The position of the support posts 300, 400 in the pour pan can be adjusted to accommodate for different sized floor boxes 100. Optionally, one or more extension members 500, 550 can be slidably engaged with a respective post 300, 400. The height of the extension members 500, 550 can be adjusted by a user as desired so that a final height for a floor box 100 is achieved. The floor box 100 can be connected to the posts 300, 400 or the extension members 500, 550 if used. For example, a threaded fastener can be placed through a flange extending from an outer wall of the floor box 100 and into a top wall of the posts 300, 400 or extension members 500, 550. Conduits can then be connected to the floor box 100 and flooring material can be poured into the pour pan 112, 212 so that the flooring material fills the pour pan 112, 212 and flows inside of the supports 300, 400 and extension members 500, 550 if present.

In certain implementations thermal members 600 can be positioned between the supports 114, 230, 300, 400 and the pour pan 112, 212, between the supports 114, 230, 300, 400 and the floor box 100, or a combination of both.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. A floor box installation assembly comprising:

a floor box having a bottom and a wall extending from the bottom to at least partially define a first interior having a wiring compartment, the wall having a knockout;

a pour pan configured to be inserted into an opening in a floor deck, the pour pan having a bottom wall, a side wall extending from the bottom wall, and a side flange extending from the side wall, the bottom wall and side wall at least partially defining a second interior;

a first support connected to the pour pan; and a second support connected to the pour pan, wherein the first and second supports are configured to support the floor box above the second interior so that a conduit can be connected in communication with the knockout above the pour pan.

2. The floor box of claim 1, wherein the flange is configured to rest on an upper surface of the floor deck.

3. The floor box of claim 1, wherein the first support is a first rail and the second support is a second rail.

4. The floor box of claim 1, wherein the first support is a first post and the second support is a second post.

5. The floor box of claim 3, wherein the first rail includes a central rib and a set of outer projections.

6. The floor box of claim 4, wherein the first support post includes a cylindrical body with a hollow interior.

7. The floor box of claim 6, wherein the cylindrical body includes a side opening configured to receive flooring material.

8. The floor box of claim 1, wherein a thermal material is positioned between the pour pan and the first support or between the first support and the floor box.

9. A floor box installation assembly comprising:

a floor box having a bottom and a plurality of walls extending from the bottom to at least partially define a first interior having a wiring compartment, at least one of the plurality of walls having a knockout;

a pour pan configured to be inserted into an opening in a floor deck, the pour pan having a bottom wall, a plurality of side walls extending from the bottom wall, and a side flange extending from each side wall, the bottom wall and side walls at least partially defining a second interior;

a first rail connected to the pour pan; and a second rail connected to the pour pan, wherein the first and second rail are configured to be spaced above the pour pan to support the floor box above the second interior so that a conduit can be connected in communication with the knockout above the pour pan.

10. The floor box of claim 9, wherein the first rail and the second rail have a first leg and a second leg extending approximately 90 degrees from the first leg.

11. The floor box of claim 9, wherein the first rail includes a central rib.

12. The floor box of claim 9, wherein the first rail includes a first projection extending from a first end and a second projection extending from a second end.

13. A floor box installation assembly comprising:

a floor box having a bottom and a plurality of walls extending from the bottom to at least partially define a first interior having a wiring compartment, at least one of the plurality of walls having a knockout;

a pour pan configured to be inserted into an opening in a floor deck, the pour pan having a bottom wall, a plurality of side walls extending from the bottom wall, and a side flange extending from each side wall, the bottom wall and side walls at least partially defining a second interior;

a first post connected to the pour pan; and a second post connected to the pour pan, wherein the first and second posts are configured to support the floor box above the second interior so that a conduit can be connected in communication with the knockout above the pour pan.

14. The floor box installation assembly of claim 13, wherein the post includes a cylindrical body and a base.

15. The floor box installation assembly of claim 14, wherein the cylindrical body includes a first side opening and a first side slot extending through the cylindrical body.

16. The floor box installation assembly of claim 13, further comprising a first extension positioned over the first post and a second extension positioned over the second post.

17. The floor box installation assembly of claim 13, wherein the first post includes a top wall with an opening configured to receive flooring material.

18. A method of installing a floor box comprising:

cutting a hole in a floor deck to form an open space;

positioning a pour pan in the open space, the pour pan having a bottom wall, a side wall extending from the bottom wall, and a side flange extending from the side wall, the bottom wall and side wall at least partially defining an interior;

connecting a first support to the pour pan;

connecting a second support to the pour pan;

positioning a floor box on the first support and the second support, the floor box having a bottom, a wall extending from the bottom, and top plate connected to the wall, the floor box being positioned on the first and second supports so that the bottom is positioned above the interior of the pour pan;

connecting a conduit to the wall of the floor box; and pouring a flooring material into the interior and around the floor box, wherein the flooring material forms an unbroken surface in the interior of the pour pan.

19. The method of claim 18, wherein connecting a first support to the pour pan includes positioning a first rail to extend over the interior.

20. The method of claim 18, wherein connecting a first support to the pour pan includes positioning a first post in the interior and securing the post to the bottom wall of the pour pan.

* * * * *